(12) United States Patent
Ettenhuber et al.

(10) Patent No.: US 10,773,895 B2
(45) Date of Patent: Sep. 15, 2020

(54) TRANSPORT SECTION USED TO CONVEY OUTER PACKAGES AND METHOD USED TO HANDLE SUCH OUTER PACKAGES

(71) Applicant: KRONES Aktiengesellschaft, Neutraubling (DE)

(72) Inventors: Klaus Ettenhuber, Schechen (DE); Thomas Auer, Niederndorferberg (AT); Bernd Koehl, Kolbermoor (DE); Christian Auracher, Bruckmuehl (DE)

(73) Assignee: KRONES Aktiengesellschaft, Neutraubling (DE)

( * ) Notice: Subject to any disclaimer, the term of this patent is extended or adjusted under 35 U.S.C. 154(b) by 0 days.

(21) Appl. No.: 16/570,413

(22) Filed: Sep. 13, 2019

(65) Prior Publication Data
US 2020/0172343 A1 Jun. 4, 2020

(30) Foreign Application Priority Data
Nov. 30, 2018 (DE) .......................... 10 2018 130 421

(51) Int. Cl.
| | |
|---|---|
| *B65G 13/02* | (2006.01) |
| *B65G 39/18* | (2006.01) |
| *B65G 47/24* | (2006.01) |
| *B65B 43/32* | (2006.01) |
| *B65G 13/12* | (2006.01) |

(52) U.S. Cl.
CPC ............ *B65G 39/18* (2013.01); *B65B 43/325* (2013.01); *B65G 13/02* (2013.01); *B65G 13/12* (2013.01); *B65G 47/24* (2013.01); *B65G 2201/025* (2013.01); *B65G 2203/0225* (2013.01)

(58) Field of Classification Search
None
See application file for complete search history.

(56) References Cited

U.S. PATENT DOCUMENTS

| | | | |
|---|---|---|---|
| 3,698,151 A | 10/1972 | Arneson | |
| 3,884,014 A | 5/1975 | Ishida et al. | |
| 3,981,120 A | 9/1976 | Ganz | |
| 4,651,502 A | 3/1987 | Ganz | |
| 5,611,193 A * | 3/1997 | Farrelly | B65B 5/105 53/245 |

(Continued)

OTHER PUBLICATIONS

German Priority Application: DE 10 2018 130 421.8—Filed Nov. 30, 2018—German Search Report dated Jul. 29, 2019.

*Primary Examiner* — Kavel Singh
(74) *Attorney, Agent, or Firm* — Simmons Perrine Moyer Bergman PLC (57) ABSTRACT

Disclosed is a method used to handle outer packages (10) with foldable top flaps (12; 12-*v*, 12-*h*, 12-*l*, 12-*r*). The handling can be carried out in association with a mechanical removal or introduction of articles (14) out of or into the outer package (10). The method provides the unfolding and/or the holding open of at least one top flap (12; 12-*v*, 12-*h*, 12-*l*, 12-*r*) in order to at least partly uncover an opening (16) to make accessible an interior space of the outer package (10), as well as providing the application of a tensile force (32) to the at least one top flap (12; 12-*v*, 12-*h*, 12-*l*, 12-*r*), the tensile force (32) being specified and/or variable over the course of the conveying phase.
The invention includes a transport section (20) which carries out the method during the conveyance of outer packages (10).

18 Claims, 6 Drawing Sheets

(56) References Cited

U.S. PATENT DOCUMENTS

| 5,732,536 | A | * | 3/1998 | Lin | ............... | B65B 5/106 |
| | | | | | | 53/245 |
| 6,928,795 | B1 | * | 8/2005 | Wilson | ............... | B65B 5/105 |
| | | | | | | 53/244 |
| 2009/0093355 | A1 | * | 4/2009 | Huang | ............... | B65B 43/265 |
| | | | | | | 493/309 |

* cited by examiner

TRANSPORT SECTION USED TO CONVEY OUTER PACKAGES AND METHOD USED TO HANDLE SUCH OUTER PACKAGES

CLAIM OF PRIORITY

The present application claims priority to German Application 10 2018 130 421.8, filed Nov. 30, 2018, which is incorporated by reference.

FIELD OF THE INVENTION

The present invention relates to a transport section used to convey outer packages therein, in particular, cuboid-shaped outer packages with foldable top flaps. The invention moreover relates to a method used to handle outer packages, in particular, cuboid-shaped outer packages with foldable top flaps, during a specified conveying phase.

BACKGROUND OF THE INVENTION

When outer packages are loaded in an automated manner with article groups, such as beverage cases or boxes with beverage containers, and also when articles or article groups are removed from outer packages in an automated manner, it is important to position the handling devices used for this purpose, which can be formed, for example, by gripper heads with controllable bottle grippers, precisely above the outer packages to make sure that the articles, containers, or bottles are seized and removed from the outer packages or positioned in the outer packages with the required precision. If boxes with openable or closeable top flaps, for example, are used as outer packages, the position or the contour of the top opening can vary according to the handling and/or the condition of these collapsible boxes, in particular, in the instance of outer packages being used several times.

It is optionally possible to carry out the automated loading of the outer packages with articles or the automated removal of articles from the outer packages in a discontinuous manner, which involves having to stop the outer packages or beverage cases typically transported in an uninterrupted product stream by conveyor belts or other horizontal conveying devices for each loading or removal process, even if they are transported at continuous conveying speed in the remaining course of the process. A continuous removal or loading with outer packages moving in an unchanged or a decelerated manner, while a handling device, such as a gripper head, removes or introduces the articles there, is however also possible.

Reusable boxes have proven to be particularly problematic in terms of dimensional accuracy or form stability, as they are frequently more or less worn and gradually lose their form stability after only a few removal or loading and rotation cycles.

When cardboard box containers are used as outer packages, it has generally turned out to be necessary to hold open the opened top flaps during the conveyance of the outer package and at least during an introduction process or removal process so that the flaps are not in an undefined position or, in the worst case, even folded in and thereby close the opening of the box, which would inevitably lead to a collision of a gripper head with the top flaps and thus to a disturbance in the handling process.

The necessity of guiding the top flaps likewise applies to newly folded and to reused boxes. In addition, reused and partly worn boxes can be deformed due to wear, thus impeding a precise positioning of the gripper heads and significantly increasing the probability of disturbances in the loading or removal process. Such disturbances can involve the gripper head catching on the rim of the box while dipping into the box, for example.

SUMMARY OF THE INVENTION

In view of the problems identified in prior art, it can be regarded as primary object of the invention to make such outer packages that possess insufficient or undefined form stability handleable to the necessary degree of reliability so that they cause preferably no or only few process disruptions in an automated removal or loading process.

This object is achieved by a method used to handle outer packages, in particular, cuboid-shaped outer packages with foldable top flaps, during a specified conveying phase, as well as by a transport section used to convey outer packages therein, in particular, cuboid-shaped outer packages with foldable top flaps, the method and the transport section having the features of the relevant independent claims. Further advantageous embodiments of the invention are described in the relevant dependent claims.

In order to achieve the above-mentioned object, the invention proposes a transport section for outer packages, in particular, cuboid-shaped outer packages with foldable top flaps, involving the transport section according to the invention to be associated, in particular, with a mechanical removal of articles located in the outer package or with a mechanical loading of the outer package with articles. Assigned to the transport section according to the invention is at least one conveying device used for the straight conveyance of at least one outer package with at least one top flap that is unfolded and/or held open, thus resulting in an at least partly uncovered opening and an interior space of the outer package that is accessible for the purpose of removal or introduction of articles. Furthermore assigned to the transport section according to the invention is at least one device located at least on one side, preferably, however, on both sides of a transport path of the conveying device and used to hold open and/or stabilize the at least one unfolded top flap in an angular position in relation to the conveyed outer package, the angular position being specified or variable over the course of conveying the outer package, and also used to apply a tensile force to the at least one top flap, the tensile force being specified and/or variable over the course of the conveying phase.

The device or traction device acting at least on one side, in particular, however, on both sides along the transport path upon the outer package and interacting with the top flaps that are being held open essentially provides for the outer packages to be stabilized and held in form such that the, in particular, cuboid-shaped interior space of the outer package lies within known boundaries in terms of its contour and position, as well as, in particular, in terms of the precise alignment of its top opening such that the transport section can interact as desired with an automatically controllable handling device that requires a precise positioning in relation to the outer package in order to be able to operate disruption-free and collision-free and in order to fill or empty the outer packages.

While plastic crates, beverage cases, or the like outer packages usually possess sufficient form stability and also usually do not have top flaps at the top, which can be folded to close a top opening and unfolded to make this top opening accessible, such that no such procedures are required as are made possible by the traction devices of the transport section according to the invention, specific problems do arise from the use and handling of boxes as outer packages; and the problems are exacerbated with the increasing usage frequency of reusable outer packages and the usually therewith associated increasing wear and decreasing form stability of the boxes. Such multiply used outer cardboard packages thus tend to wear and to have decreasing form stability, which is intensified on contact, even only once, with a liquid. For this reason, it is indispensable to compensate in a suitable manner for the decreasing and/or insufficient form stability with regard to the handling of such outer cardboard packages and, in particular, with regard to their interacting with an automatically controllable handling device, such as a gripper head with articles, for example beverage containers or bottles, guided therein.

The transport section is optionally equipped with two traction devices of the same type disposed on both sides of the transport path, with the traction devices being used to hold open and/or stabilize two unfolded top flaps and to apply a tensile force to the particular opened top flaps, the tensile force being specified and/or variable over the course of the conveying phase. For it has been shown that the boxes conveyed in such a way can be stabilized in their entire cuboid-shaped contour by applying lateral tensile forces to the approximately horizontally unfolded top flaps on the longitudinal side, and they can thus be made accessible for an automatically controlled handling device without the constant risk of the top flaps colliding with the lateral edges or rims of an outer cardboard package that is gradually going out of shape due to multiple use.

With regard to the transport section according to the invention, it has thus proved particularly advantageous to apply tensile forces by the traction devices in each instance to the two oppositely located top flaps of the outer cardboard package to be in each instance brought into form, and to hold the top flaps at a specified opening angle, whereby their opened position is approximately on a plane spanned by the opening of the outer package between the two opened top flaps. It is readily comprehensible to the person skilled in the art that inclinations of the top flaps of up to 20 degrees in both directions are optionally acceptable. The inclination angles of the top flaps by which they are inclined in relation to a horizontal, however, should not be substantially greater than the mentioned 20 degrees, as otherwise the risk increases of the box being deformed in an unfavorable manner or of the top flaps tearing at their bending edges.

One particularly advantageous embodiment variant of the transport section according to the invention can provide that the traction devices are formed by or comprise contact elements or rails that act upon a top side and/or upon an underside of the opened top flaps while the outer package is being conveyed through between the rails or contact elements. In this connection it is normally expedient to dimension the tensile forces acting upon the top flaps laterally and in a direction approximately perpendicular to the vertical side walls of the outer package, which side walls the top flaps are connected to at the top longitudinal edges, in such a way that the outer package is stabilized, however, without creating the risk of overtaxing the folding edge at which the top flaps are connected to the side walls of the outer package.

The traction devices or contact elements can optionally comprise at least one roller contacting the top flap and rolling off on the top flap during the conveying phase, with the rotational plane of the roller and a transport direction of the outer package enclosing an angle between zero degrees and about twenty degrees, in particular, of about five degrees to fifteen degrees. That is to say that the roller's approximately horizontally disposed axis of rotation is located at an angle of about 80 degrees to the transport direction of the outer package. Accordingly, the rotational plane of this at least one roller rolling off on a top side or on an underside of the top flap and a transport direction of the outer package enclose an acute angle of about 0 degrees to 10 degrees, whereby the top flap is pulled away from the outer package in the course of conveying the outer package due to the influence of the roller, thus achieving the desired positive effect on the form stability of the outer package.

Equally conceivable and suitable for the desired purpose is a variant of the transport section, in which the traction devices or contact elements are in each instance formed by two or more rollers disposed in parallel arrangement and spaced apart from each other. That is to say that the rollers in this context are disposed one after another and all in approximately the same alignment.

In all these variants with rollers rolling off on the top flaps, it can be provided that the rollers operate without being powered by a drive of their own, however, that they exert a specified pressure on the top side or underside of the particular top flap so that they cannot not simply slide off diagonally on the top flap, as this would be unfavorable for generating the desired lateral tensile forces. By contrast, a relatively low slippage of the rollers as can be promoted by their material composition—which can envisage an elastomer material as running surface, for example—provides for the desired tensile forces on the top flaps.

In this transport section, a plurality of rollers can optionally be disposed in each instance on both sides of the transport path for the purpose of applying tensile forces to each of the two lateral top flaps.

In particular, it can moreover be provided in the transport section that the approximately horizontally located top flaps are guided in such a manner that they are conveyed into a clearance where they bear on a flat support while the diagonally disposed rollers rolling off on their particular top sides with a specified pressure produce the outward directed tensile forces and in such a way provide for the form stabilization of the outer package. The box is thereby expanded and largely precisely brought into its intended contour such that the top opening is approximately rectangular and precisely in the intended position for a handling device with gripper head.

As already explained above, the term top flaps as used here normally refers to the unfoldable and closeable box flaps of an outer cardboard package, in particular, of a reusable outer cardboard package.

In one embodiment variant of the invention, spring-mounted and rubberized rollers are installed in a slanted position at the bundle track. The top flaps are pulled outward and the box rim is pressed against the bundle track rail by the forward motion. The box is thereby spread apart so that the gripping head does not get caught on the box rim when dipping into the box.

If the term "transport section" is used in the present context, this particularly refers to a section of a transport path inside a handling machine and/or packaging machine and/or unpacking machine, in which the therein conveyed outer packages are conveyed through in the above described manner with opened top flaps and, in the process, are held in the desired form and alignment by the tensile forces laterally applied to the top flaps, in order to be loaded with articles while passing through the transport section, or in order for articles to be removed from the outer package while the outer package passes through the transport section, namely in an automated manner. The type of conveying device as well as upstream or downstream conveying modules or handling modules are deliberately not specified in the definition of the transport section, as the transport section according to the invention is not influenced hereby.

In addition to the transport section according to the invention as proposed in different embodiment variants, the present invention furthermore proposes a method used to handle outer packages, in particular, cuboid-shaped outer packages with foldable top flaps, during a specified conveying phase in order to achieve the above-mentioned goal, involving the method to be carried out in association, in particular, with a mechanical removal of articles located in the outer package or with a mechanical loading of the outer package with articles. The method provides the unfolding and/or the holding open of at least one top flap in order to at least partly uncover an opening of the outer package to make accessible an interior space of the outer package, as well as providing the application of a tensile force to the at least one top flap, the tensile force being specified and/or variable over the course of the conveying phase. Since the outer packages that are used are frequently boxes that are relatively flexible and partly worn by multiple usage and that have to be brought into form by horizontally pulling at the top flap, the method according to the invention offers a possibility of bringing about the required tensile forces during the transport of these outer cardboard packages.

The method can particularly provide that two oppositely located top flaps of the outer package with parallel folding edges are pulled apart with oppositely directed tensile forces, whereby the boxes or outer packages can be stabilized and brought into the desired form.

In addition, the method can provide that the at least one top flap or the two top flaps located opposite each other are held at an opening angle and tensile forces are applied thereto, with the opening angle being approximately on a plane spanned by the opening of the outer package between the two opened top flaps. Inclinations of up to 20 degrees in both directions are optionally also acceptable in this context, but preferably no more than 20 degrees, as the box would otherwise be deformed in an unfavorable manner.

The method can furthermore provide that the tensile forces are generated by contact elements or rails acting upon a top side and/or upon an underside of the opened top flaps while the outer package is being conveyed through between the rails or contact elements.

In a further variant of the method, the contact elements comprise at least one roller contacting the top flap and rolling off on the top flap during the conveying phase, with the rotational plane of the roller and a transport direction of the outer package enclosing an angle between zero degrees and about twenty degrees, in particular, of about five degrees to fifteen degrees; that is to say that the roller's approximately horizontally disposed axis of rotation is located at an angle of about 80 degrees to the transport direction of the outer package. Optionally, the contact elements can each be formed by two or more rollers disposed in parallel arrangement and spaced apart from each other, that is to say that the rollers are disposed one after another and all in approximately the same manner and alignment. In this instance, a plurality of rollers is preferably disposed in each instance on both sides of the transport path for the purpose of applying tensile forces to each of the two lateral top flaps.

A variant of the method according to the invention that is particularly favorable for the intended purpose of application provides that the approximately horizontally located top flaps are conveyed into a clearance where they bear on a flat support while the diagonal rollers rolling off on their particular top sides with a specified pressure produce and cause the outward directed tensile forces. The box is thereby expanded and largely precisely brought into its intended contour such that the top opening is approximately rectangular and precisely in the intended position for a handling device with gripper head. The top flaps are, in particular, box flaps of an outer cardboard package.

If a top opening of the outer packages or boxes is at times referred to in the context of the above description, this is by no means intended to be understood in a restrictive sense. The invention can likewise be applied to outer packages or boxes where the articles are loaded or unloaded using the so-called side-load method. In this instance, the direction of the two tensile forces simply changes to act in substantially vertical directions (upward or downward, as applicable) upon one box flap that faces downward and one that faces upward.

It should also be mentioned that the method can be carried out in association with a mechanical removal of articles located in the outer package or with a mechanical loading of the outer package with articles, which involves that the method provides the unfolding and/or the holding open of at least one top flap in order to at least partly uncover an opening of the outer package to make accessible an interior space of the outer package, as well as providing the application of a tensile force to the at least one top flap, the tensile force being specified and/or variable over the course of the conveying phase.

The present invention moreover comprises a transport section that is part of a transport path for an outer package where the lateral top flaps of the outer package are pulled open and the top opening of the outer package is held in a specified position and contour by a method according to one of the embodiment variants described above.

The transport section or the transport path according to the invention is optionally assigned a handling device with at least one gripper head for the removal of articles from the outer package that has been opened and brought into form. It is equally conceivable that the transport section or the transport path is assigned a handling device with gripper head for the introduction of articles into the outer package that has been opened and brought into form.

It should be explicitly mentioned at this point that all aspects and embodiment variants explained in the context of the transport section for outer packages according to the invention can likewise pertain to or constitute partial aspects of the method according to the invention. If specific aspects and/or interrelations and/or effects relating to the transport section according to the invention are referred to at some point in the present description or in the claims definitions, this therefore likewise pertains to the method according to the invention. The same applies conversely, so that all aspects and embodiment variants explained in the context of the method according to the invention can likewise pertain to or constitute partial aspects of the transport section according to the invention. If specific aspects and/or interrelations and/or effects relating to the method according to the invention are referred to at some point in the present description or in the claims definitions, this therefore likewise pertains to the transport section according to the invention.

BRIEF DESCRIPTION OF THE FIGURES

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

FIG. 2 shows two alternative embodiment variants of a contact element used to generate the tensile forces acting upon the top flaps in two schematic top views (FIG. 2A and FIG. 2B).

FIG. 3 shows a more concretely designed embodiment variant of the transport section used to convey and handle outer packages, rendered in a total of four schematic perspective views (FIG. 3A, FIG. 3B, FIG. 3C, and FIG. 3D).

The same or equivalent elements of the invention are designated using identical reference characters. Furthermore, and for the sake of clarity, only the reference characters relevant for describing the individual figures are provided. It should be understood that the detailed description and specific examples of how to design the embodiments of the transport section and how to implement the method according to the invention are intended for purposes of illustration only; the following description of the embodiments does not limit the scope of the invention.

DETAILED DESCRIPTION OF THE INVENTION

Figure 1:
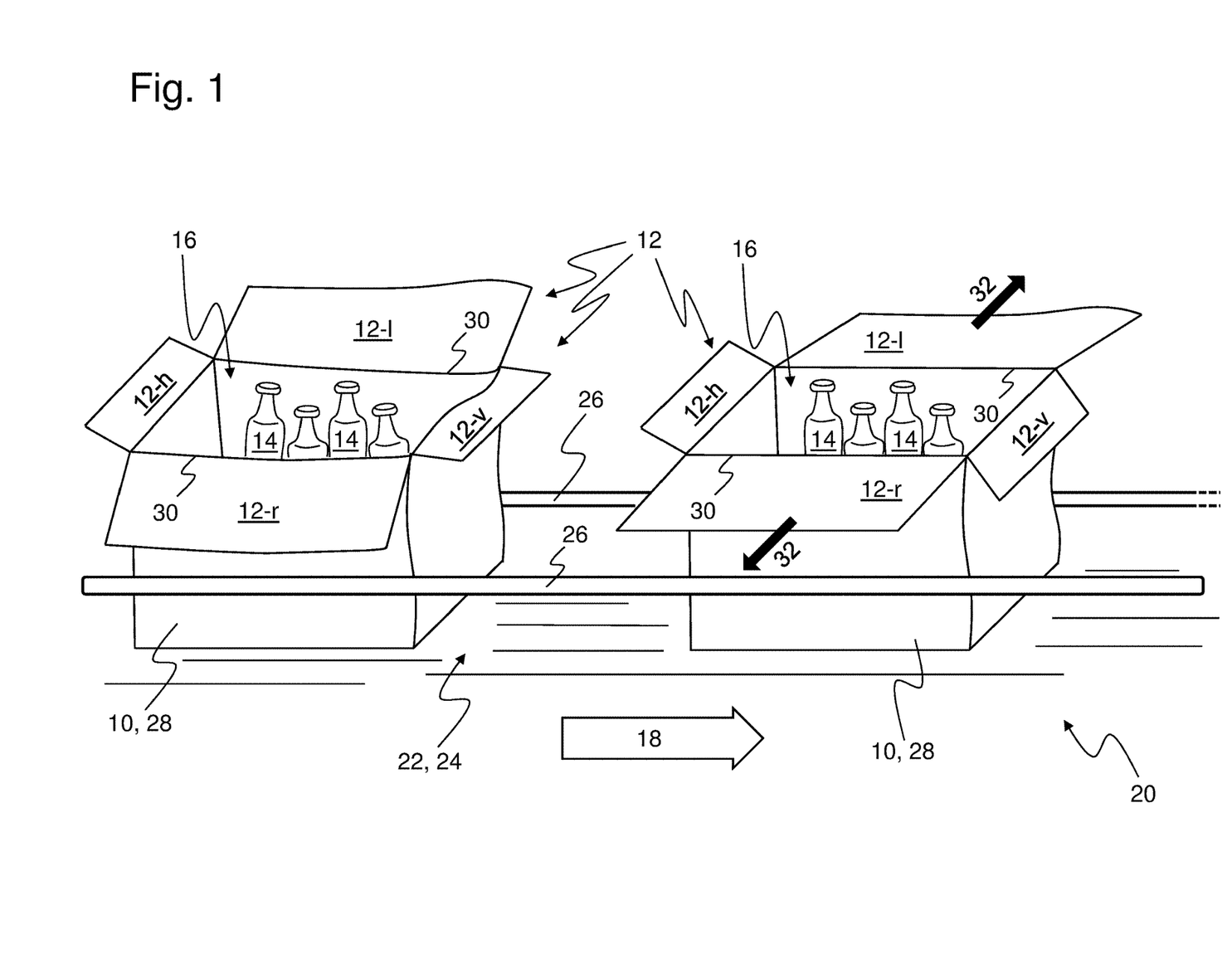
FIG. 1 shows a schematic perspective view of an embodiment variant of a transport section in which outer packages are conveyed and laterally acting tensile forces are applied to the top flaps of the outer package.

The schematic perspective view in FIG. 1 illustrates the essential aspects that can be achieved in carrying out the method according to the invention when and in the context of handling outer packages 10, in particular, cuboid-shaped outer packages 10 with a total of four foldable top flaps 12 (12-*l*, 12-*r*, 12-*v*, 12-*h*), during a specified conveying phase of the outer package 10. Without it being illustrated in detail in FIG. 1, it should be pointed out that this method can be carried out in association, in particular, with a mechanical removal of articles 14 located in the outer package 10 or with a mechanical loading of the outer package 10 with articles 14.

As illustrated on the left side of FIG. 1, the method can provide the unfolding and/or the holding open of at least two oppositely located top flaps 12 in order to at least partly uncover a top, rectangular opening 16 of the outer package 10 to make accessible an interior space of the outer package 10 while the outer package 10 is being transported in a conveying direction 18 on a transport section 20, which is merely indicated here. The conveying path, here generally referred to as transport section 20, comprises, in particular, a horizontal conveying device 24 or the like moving along with the support surface 22 in conveying direction 18, on which horizontal conveying device 24 the outer packages 10 are conveyed standing upright on their base surfaces, which is carried out in a conveying direction facing to the right in the illustration in FIG. 1.

In order to stabilize the outer packages 10 on their conveying path, additional guide rails 26 can be provided on both sides above the level of the support surface 22, between which guide rails 26 the outer packages 10 slide along when they are being moved in a straight line by the horizontal conveying device 24. In this connection, the longitudinal extension directions of the guide rails 26 have to be aligned parallel to the conveying direction 18 in order to prevent the outer packages 10 from shifting laterally or from being twisted while being conveyed. In the shown schematic perspective view of FIG. 1, such a guide rail 26 is disposed in each instance at both sides of the conveying path of the horizontal conveying device 24. However, a plurality of parallel guide rails 26 can optionally also be disposed on top of each other, although this is not illustrated here.

Optionally, a non-illustrated handling device with at least one gripper head for the removal of the articles 14 from the opened outer package 10 can be assigned to the transport section 20 schematically indicated in FIG. 1. Such a handling device with gripper head or with a plurality of gripper heads is expediently located in an area downstream from the transport section 20 shown in FIG. 1, because located in the outer packages 10 shown there are in each instance those above-mentioned articles 14 that can be removed from the outer packages 10 in a section located further to the right.

It is equally conceivable that a non-illustrated handling device with at least one gripper head for the introduction of the articles 14 into the opened outer package 10 is assigned to the transport section 20 schematically indicated in FIG. 1. Such a handling device with gripper head or with a plurality of gripper heads is expediently located in an area upstream from the transport section 20 shown in FIG. 1, because located in the outer packages 10 shown there are in each instance those above-mentioned articles 14 that can be introduced into the outer packages 10 in a section located further to the left.

The shown outer packages 10 are normally formed by cuboid-shaped boxes 28, which can be problematic in terms of their form stability. The articles 14 can be formed, in particular, by beverage containers of glass or plastic, that is, by bottles. Since plastic crates, beverage cases, or the like outer packages 10 usually possess sufficient form stability and also usually do not have top flaps 12 at the top, which can be folded to close a top opening 16 and unfolded to make this top opening 16 accessible, such form stable crates and outer packages usually require no further procedures to ensure a precise positioning of a handling device and to prevent collisions of the handling device with the upper rims of the outer package.

As indicated by the outer package 10 shown on the left side in FIG. 1, specific problems arise from the use and handling of boxes 28 as outer packages 10; and the problems are exacerbated with the increasing usage frequency of reusable outer packages 10 and the usually therewith associated increasing wear and decreasing form stability of the boxes 28. Such multiply used outer cardboard packages 10 thus tend to wear and to have decreasing form stability, which is intensified on contact, even only once, with a liquid. The not exactly cuboid-shaped left box 28 with its slightly deformed, billowing top flaps 12 and side walls in FIG. 1 possibly has a top opening 16 that is not exactly rectangular, with its position in relation to a required position moreover being possibly shifted and/or twisted, which may complicate the positioning of a handling device with a gripper head for the introduction of the articles 14 or beverage containers into or for their removal from the outer package 10 or the box 28, as applicable, or which can even lead to a disturbance caused by a collision while positioning the gripper head.

By suitable holding devices (not shown here), the front top flap 12-*v* and the back top flap 12-*h*—as seen in conveying direction 18—can optionally be held open and prevented from colliding with a gripper head due to undesired folding shut or from hampering the gripper head while handling the articles 14 or the beverage containers. However, more important for an increase of the form stability of the box 28 are the lateral, left top flap 12-*l* as well as the lateral, right top flap 12-r—as seen in conveying direction 18—that are here located on the left and right side at the upper longitudinal sides of the box 28 or of the outer package 10, as applicable, and that are in each instance swivelably connected via a folding edge 30 to the particular side wall of the box 28 or of the outer package 10, as applicable. The two folding edges 30, where the left and right top flap 12-l and 12-r are connected to the upper circumferential rim of the box 28 or of the outer package 10, as applicable, run parallel to the conveying direction 18 as well as to the longitudinal extension directions of the two guide rails 26.

These left and right top flaps 12-l and 12-r do not only have to be held open and prevented from folding shut like the front and back top flaps 12-v and 12-h, but for this purpose the invention rather provides that tensile forces 32 are to engage in each instance with both oppositely located top flaps 12-l and 12-r of the outer package 10 or of the box 28, as applicable, and that the top flaps 12-l and 12-r are pulled apart with oppositely directed tensile forces 32, whereby the boxes 28 or outer packages 10 can be stabilized and brought into the desired form. In this way, the left top flap 12-l is pulled to the left approximately horizontally and perpendicular to the conveying direction 18 by the thereto applied tensile force 32, while the right top flap 12-r is pulled to the right approximately horizontally and perpendicular to the conveying direction 18 by the thereto applied tensile force 32. In this manner, the decreasing and/or insufficient form stability of the shown box 28 is compensated for, which is indispensable with regard to the handling of such outer cardboard packages 10 and, in particular, with regard to their interacting with an automatically controllable handling device, such as a gripper head with articles 14, for example beverage containers or bottles, guided therein.

The two top flaps 12-l and 12-r that are located opposite each other are preferably held at an opening angle and tensile forces 32 are applied thereto, with the opening angle being approximately on a plane spanned by the opening 16 of the outer package 10 or the box 28 between the two opened top flaps 12-l and 12-r. Inclinations of up to 20 degrees in both directions (not shown here) are optionally also acceptable in this context, but preferably no more than 20 degrees, as the box 28 would otherwise be deformed in an unfavorable manner with greater upward or downward inclinations of the top flaps 12-l and 12-r.

Essentially, the top flaps 12-l and 12-r that are stabilized and pulled outward by the tensile forces 32 provide for the form stability of the box 28 and for the precise centering and alignment of its top opening 16 such that a gripper head that is lowered there for the introduction or removal of articles 14 can hardly collide with the rim of the outer package 10 or of the box 28 anymore.

Figures 2A, 2B:
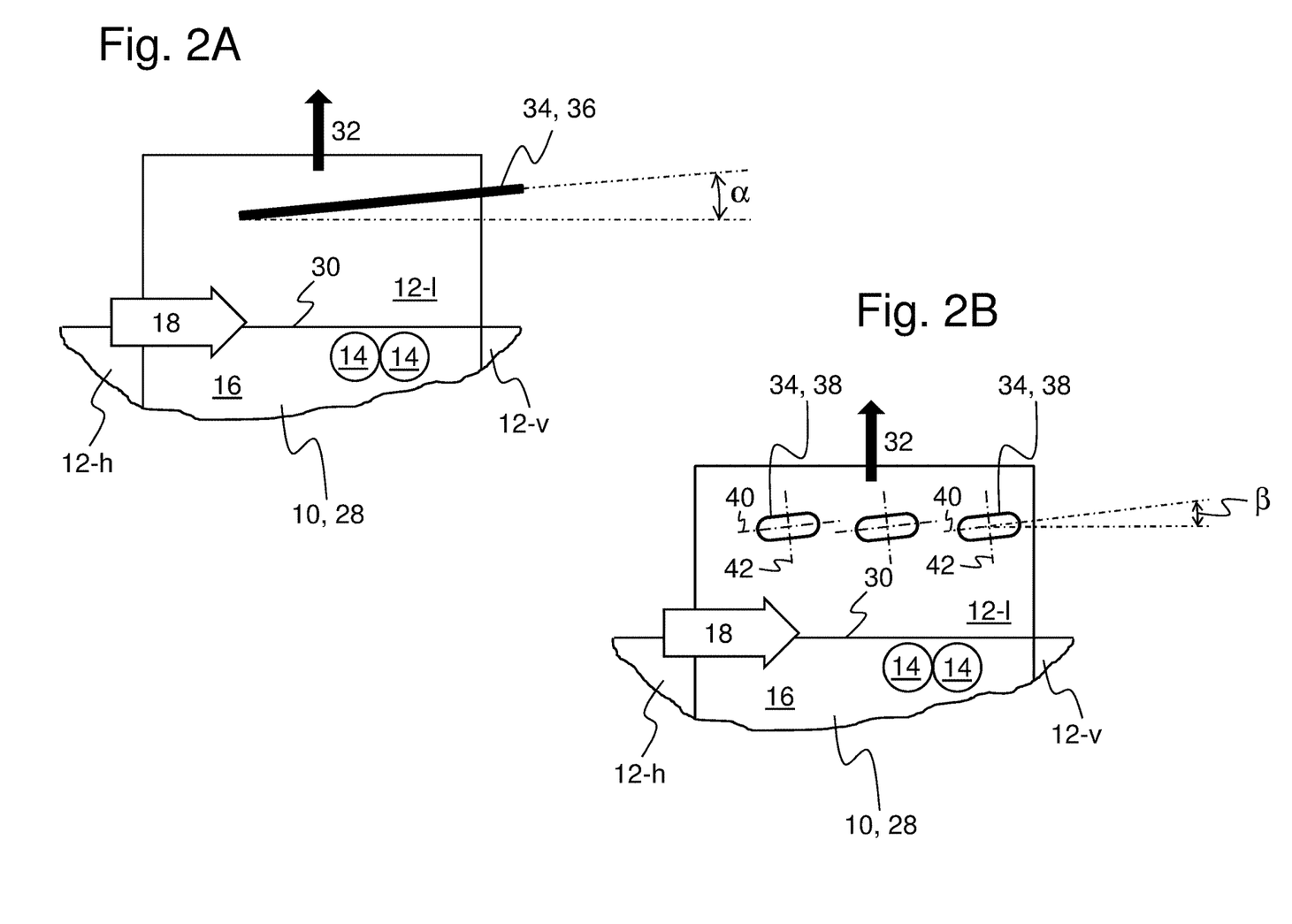

The schematic top views of FIGS. 2A and 2B show two different embodiment variants of contact elements 34 that can be used to apply the tensile forces 32 to the top flaps 12.

The schematic top view of FIG. 2A thus shows a diagonally disposed rail 36 forming a contact element 34, with only the left top flap 12-l and a part of the remaining outer package 10 or of the box 28, as applicable, with the articles 14 or beverage containers located therein being shown in the detailed view of FIG. 2A. The rail 36 forming the contact element 34 and the conveying direction 18 enclose a small angle α of about 5° to 15°, and the rail 36 is adjusted in such a manner that the top side of the left top flap 12-l is pulled through in contiguous contact under the rail 36 when the outer package 10 or the box 28, as applicable, is moved in conveying direction 18. A here non-illustratable friction-increasing ledge on the underside of the rail 36 forming the contact element 34 and bearing on the top side of the left top flap 12-l can provide for the top flap 12-l to be pulled in a direction perpendicular to the conveying direction 18, which results in the tensile force 32 indicated by the arrow. This tensile force 32 pulls the top flap 12-l to the left in relation to the conveying direction 18 and thereby brings the opening 16 of the outer package 10 into a regular, in particular, into a rectangular contour, thus ideally reducing or even eliminating disturbing deviations in the shape of the box 28.

The mentioned ledge at the underside of the rail 36 can be formed, for example, by use of elastomer or by a suitable elastomer coating and/or elastomer cover of the rail 36 such that an effective power transmission for the generation of the tensile force 32 is made possible during the passing of the top flaps 12-l.

In a corresponding manner, a tensile force 32 acting to the right in relation to the conveying direction 18 is applied to the here non-illustrated right top flap 12-r by a symmetrically disposed contact element 34 in the shape of a rail 36.

The schematic top view of FIG. 2B, by contrast, shows an alternative embodiment variant of the contact elements 34 in the shape of a plurality of rails 38 in a slanted position, with again only the left top flap 12-l and a part of the remaining outer package 10 or of the box 28, as applicable, with the articles 14 or beverage containers located therein being shown in the detailed view of FIG. 2B. The desired effect of the contact element 34 can optionally be generated by at least one such roller 38; FIG. 2B, however, shows a variant with three rollers 38 mounted one after the other in flush alignment and regularly spaced apart. Optionally, more than three such rollers 38 can also be disposed one after another.

The rollers 38 forming the contact element 34 or the contact elements 34, as applicable, are disposed diagonally in such a manner that their rotational planes 40 and the conveying direction 18 in each instance enclose a small angle β of about 5° to 15°. In this way, the rollers 38, just like the rail 36, are also adjusted in such a manner that the top side of the left top flap 12-l is pulled through in contiguous contact under the diagonally running rollers 38 when the outer package 10 or the box 28, as applicable, is moved in conveying direction 18. The rollers 38 passively rotating about their axes of rotation 42 without drives preferably have a friction-increasing outer running surface, which reduces the slippage between the rollers 38 and the top side of the left top flap 12-l and provides for the top flap 12-l to be pulled in a direction perpendicular to the conveying direction 18. This tensile effect results in the tensile force 32 indicated by the arrow, which pulls the top flap 12-l to the left in relation to the conveying direction 18 and in such a way brings the opening 16 of the outer package 10 into a regular, in particular, into a rectangular contour, and at the same time reduces or even eliminates disturbing deviations in the shape of the box 28.

The entire rollers 38 or their running surfaces can be formed from a suitable elastomer material or can have a suitable elastomer coating, for example, such that an effective power transmission for the generation of the tensile force 32 is made possible during the passing of the top flaps 12-l.

In a corresponding manner, a tensile force 32 acting to the right in relation to the conveying direction 18 is applied to the here non-illustrated right top flap 12-r by a symmetrically disposed contact element 34 in the shape of a diagonally running roller 38 or a plurality of diagonally running rollers 38 disposed one after another.

The total of four schematic perspective views of the FIGS. 3A, 3B, 3C, and 3D illustrate the arrangement of the rollers 38 forming the contact elements 34 according to the second embodiment variant schematically shown in FIG. 2B.

The here not shown left top flap 12-*l* of the box 28 forming the outer package 10 is conveyed in conveying direction 18 (see long arrow in FIG. 3A) into a horizontal guide clearance 44 where it is pressed with its underside onto a horizontal support surface 46 by the diagonally running rollers 38 exerting slight pressure. There, the left top flap 12-*l* can slide along with low resistance while the diagonally running rollers 38 provide for the generation of the tensile force 32 (cf. FIG. 2A) acting upon the top flap 12-*l* in the course of conveying the box 28 by their friction-increasing running surface 48.

Figure 3A:
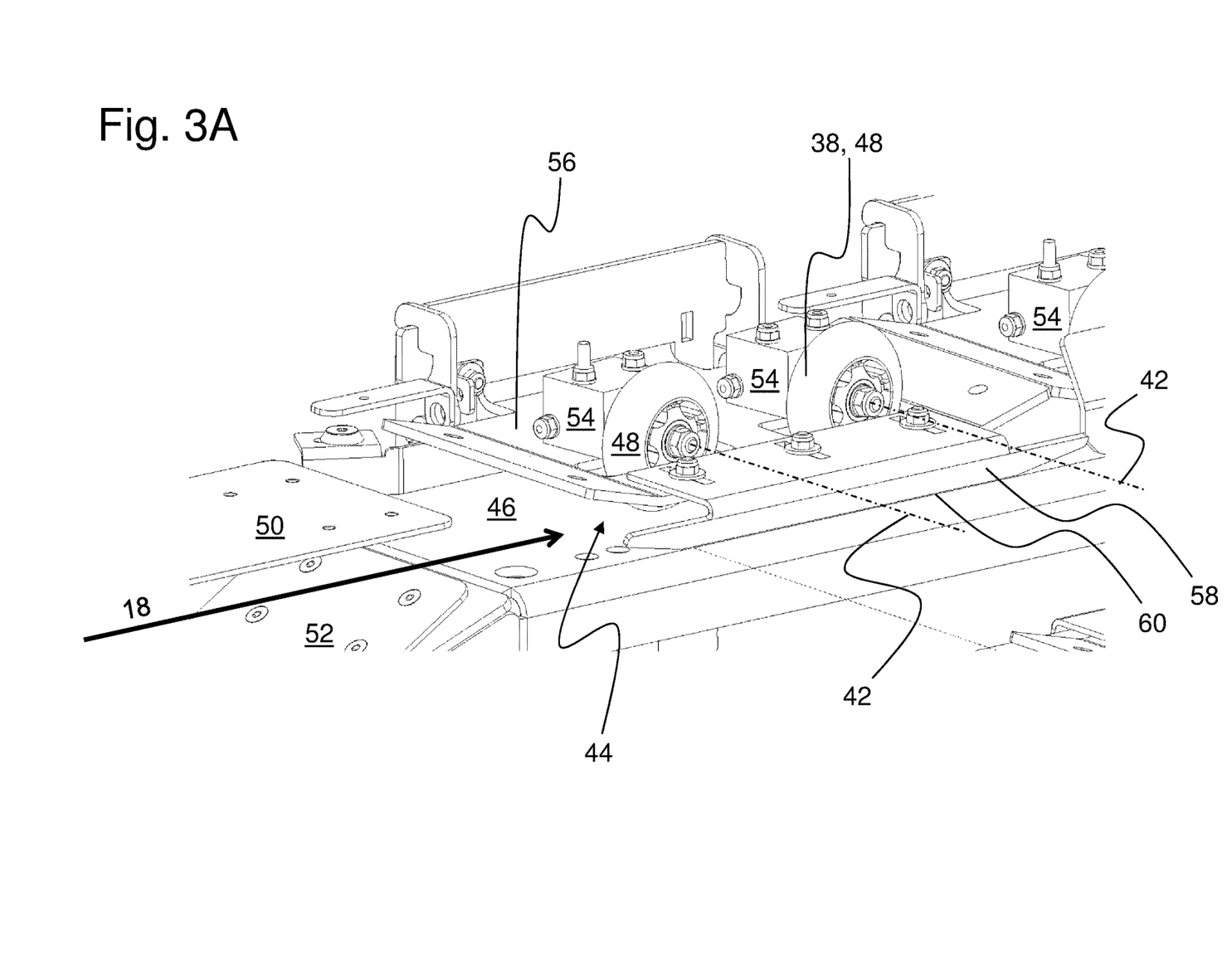

In order for the left top flap 12-*l* not to miss the horizontal guide clearance 44, guide plates 50 and 52 arranged in a funnel-shaped manner are disposed upstream in conveying direction 18 from the guide plates 50, 52, more precisely, an upper guide plate 50 is disposed in horizontal alignment above the level of the support surface 46 and a lower guide plate 52 is disposed in a diagonal manner below the level of the support surface 46. The lower guide plate 52 ascends in conveying direction 18 such that its distance to the upper guide plate 50 reduces up to immediately at the beginning of the support surface 46. The guide plates 50 and 52 end at the edge of the horizontal support surface 46, with the lower guide plate 50 ending at the level of height of the support surface 46 or just below.

Each of the rotatably mounted rollers 38 is mounted in an own bearing block 54, with each of these bearing blocks 54 being detachably and adjustably bolted to a holding plate 56 such that the angular position of the at all times horizontally disposed axes of rotation 42 of each roller 38 can be adjusted within certain limits in order to be able to in such a way vary the tensile force 32 generated by the rollers 38 and intended to act upon the top flap 12-*l*. At a longitudinal side of the holding plate 56 facing toward the outer package (not shown here) conveyed past the holding plate 56 is an additional angled guide section 58, the horizontal lower edge 60 of which is disposed above the support surface 46 at a spacing corresponding to at least the thickness of the top flap 12-*l* that is moved through between the lower edge 60 of the guide section 58 and the support surface 46.

Figure 3B:
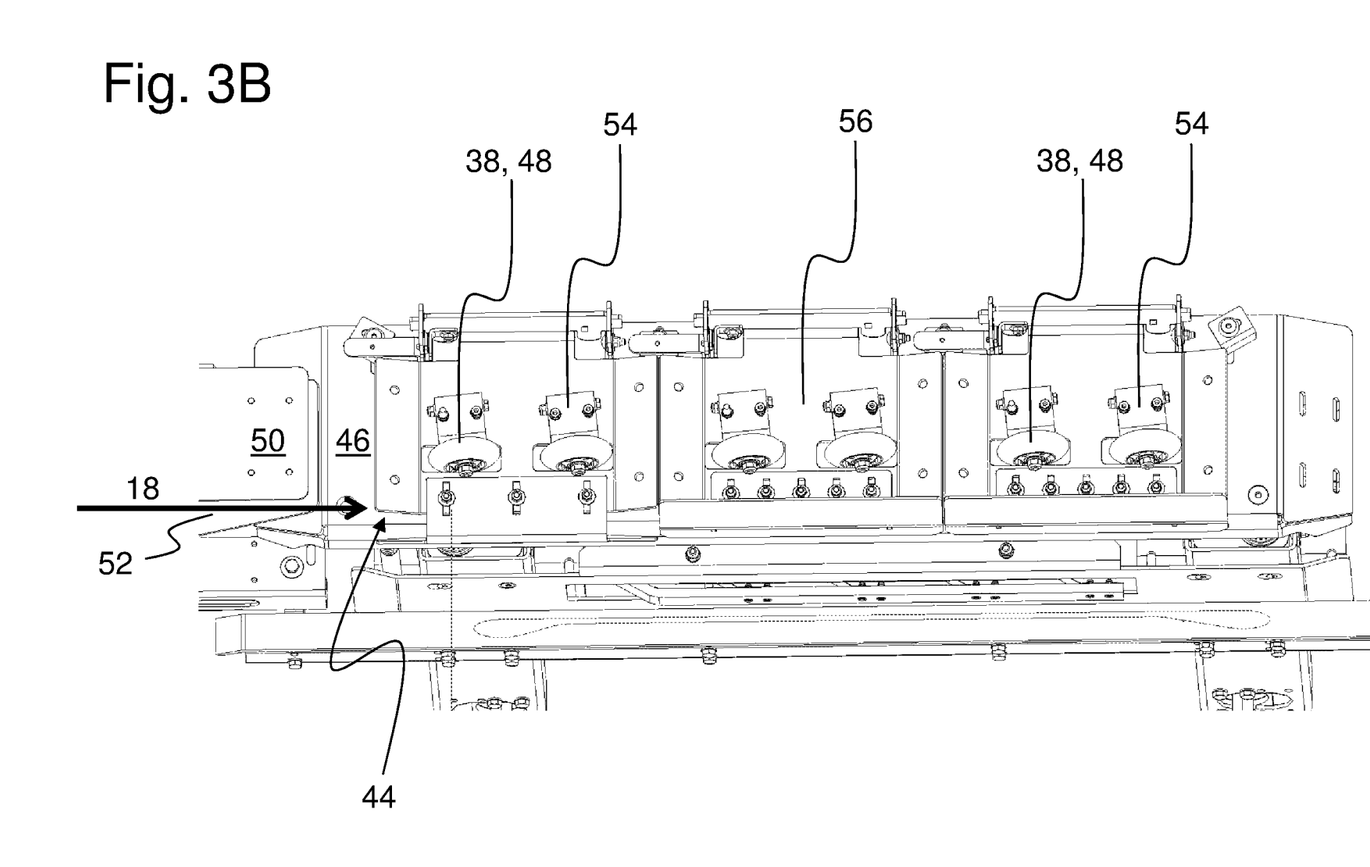
Figure 3C:
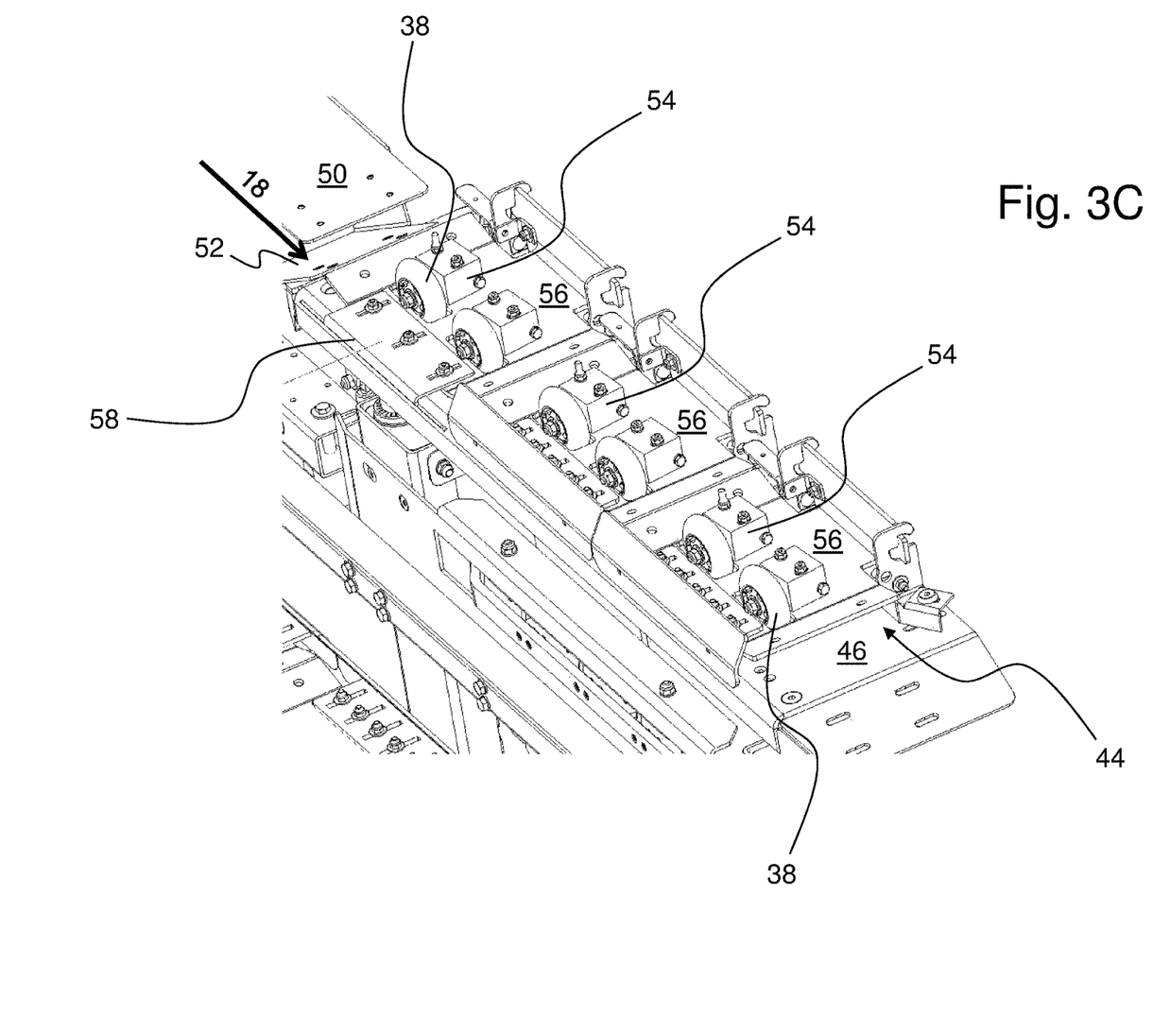
Figure 3D:
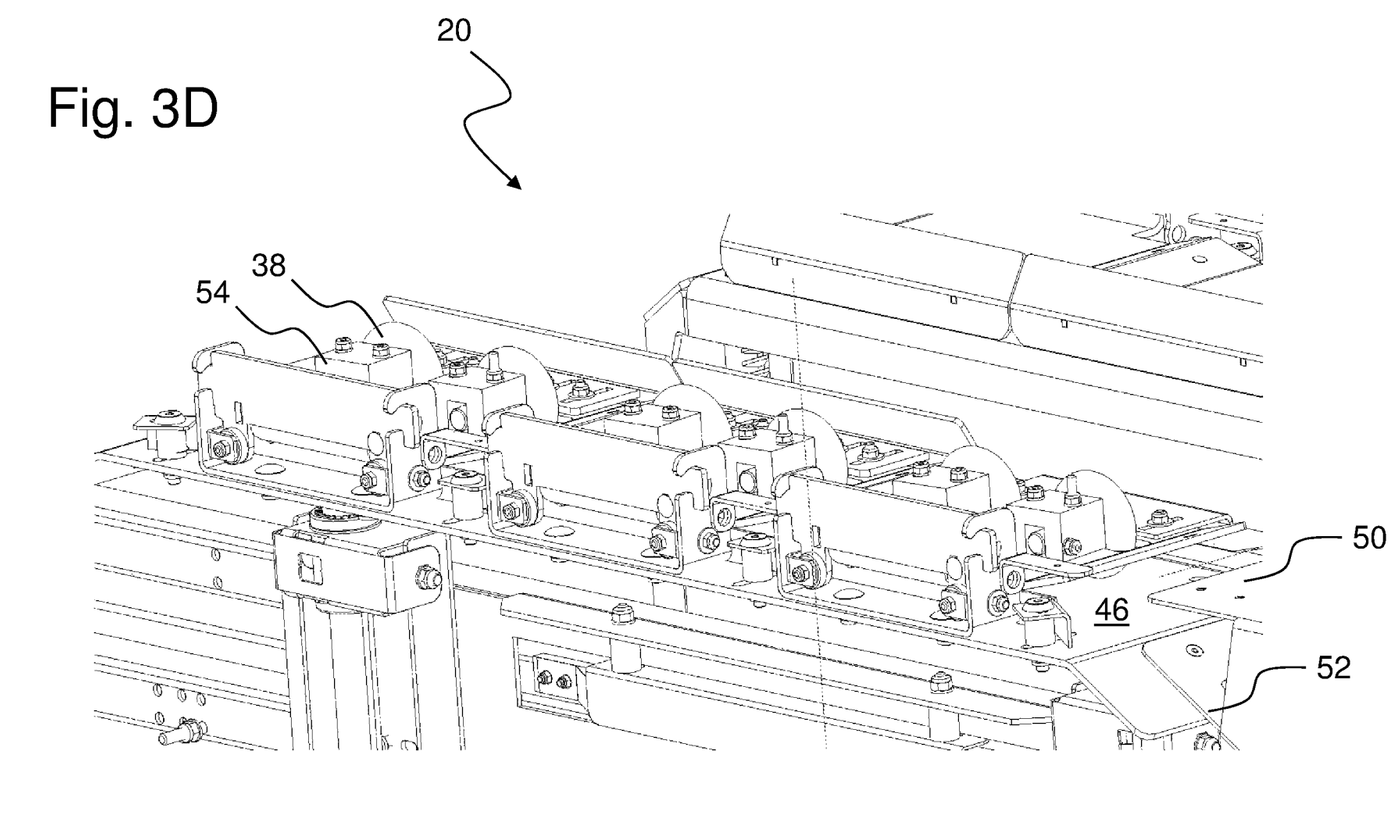

As is discernible from the FIGS. 3B and 3C, a total of six rollers 38 mounted one after another in flush alignment and regularly spaced apart can be provided on each side of the transport section 20. Both sides of the transport section 20 are discernible from FIG. 3D, with there being no rollers illustrated in the right part of the transport section 20. A tensile force 32 acting to the right in relation to the conveying direction 18 is applied to the here non-illustrated right top flap 12-*r*, in a corresponding manner, by symmetrically disposed contact elements 34 in the shape of a plurality of diagonally running rollers 38, in particular, six rollers 38.

Beside the variant of the contact elements 34 of the transport section 20 explained in the FIGS. 2B and 3A to 3D, in which the rollers 38 are freely rotatable and without own drive, an alternative variant can optionally also provide a motor drive for the rollers 38 or for individual rollers 38, whereby the conveyance of the outer packages 10 is supported and the stabilization of the lateral top flaps 12-*l* and 12-*r* and thus the dimensional accuracy of the opening 16 of the outer package 10 can be further improved.

If a top opening 16 of the outer packages 10 or boxes 28 is always referred to in the context of the description of an expedient or preferred exemplary embodiment (cf., for example, FIG. 1), this is by no means intended to be understood in a restrictive sense. The invention can likewise be applied to outer packages 10 or boxes 28 where the articles 14 are loaded or unloaded using the so-called side-load method. In this instance, the direction of the two tensile forces 32 simply changes to act in substantially vertical directions (upward or downward, as applicable) upon one box flap 12 that faces downward and one that faces upward. That is to say that the arrangement of FIG. 1 can be conceived as an imaginary axis of rotation that is rotated about the transport direction 18 by approximately a quarter of a rotation in one or the other direction; in this instance it would represent a so-called side-load arrangement, while FIG. 1 illustrates a so-called top-load situation.

The invention has been described with reference to a preferred embodiment. Those skilled in the art will appreciate that numerous changes and modifications can be made to the preferred embodiments of the invention and that such changes and modifications can be made without departing from the spirit of the invention. It is therefore intended that the appended claims cover all such equivalent variations as fall within the true spirit and scope of the invention.

LIST OF REFERENCE CHARACTERS

10 Outer package
12 Top flap
12-*v* Front top flap
12-*h* Back top flap
12-*l* Left top flap
12-*r* Right top flap
14 Article, beverage container
16 Opening, rectangular opening
18 Conveying direction
20 Transport section
22 Support surface
24 Horizontal conveying device, conveying device
26 Guide rail
28 Box
30 Folding edge
32 Tensile force
34 Contact element
36 Rail
38 Roller
40 Rotational plane
42 Axis of rotation
44 Horizontal guide clearance
46 Support surface, horizontal support surface
48 Running surface
50 Upper guide plate
52 Lower guide plate
54 Bearing block
56 Holding plate
58 Guide section
60 Lower edge

The invention claimed is:
1. A transport section (20) comprising:
at least one conveying device (24) used for a straight conveyance of at least one outer package (10) with a plurality of top flaps (12; 12-*v*, 12-*h*, 12-*l*, 12-*r*); and
at least two traction devices of the same type disposed on either side of the conveying device (24) and each used to hold open and/or stabilize at least one of the plurality of top flaps (12; 12-*v*, 12-*h*, 12-*l*, 12-*r*) wherein each applies a tensile force (32) to at least one of the plurality top flaps (12; 12-*v*, 12-*h*, 12-*l*, 12-*r*), wherein the two tensile forces are perpendicular to a conveying direction 18 and opposite one another.

2. The transport section of claim 1, wherein the at least two traction devices comprise one or more contact elements (34), which act upon a top side of the opened top flaps (12; 12-v, 12-h, 12-l, 12-r) or rails (36), which act upon an underside of the opened top flaps (12; 12-v, 12-h, 12-l, 12-r) while the outer package (10) is being conveyed.

3. The transport section claim of 2, wherein the one or more contact elements (34) comprise at least one roller (38) contacting the top flap (12; 12-v, 12-h, 12-l, 12-r), wherein a rotational plane (40) of the at least one roller (38) and the transport direction (18) enclose an angle (β) between zero degrees and about twenty degrees.

4. The transport section of claim 3, wherein the one or more contact elements (34) each comprise two or more rollers (38) that are spaced apart from each other and their rotational planes (40) are parallel.

5. The transport section of claim 4, comprising at least two contact elements (34), with at least one contact element (34) disposed on each side of the transport path.

6. The transport section of claim 5, further comprising a handling device with at least one gripper head is assigned for the removal or introduction of articles (14) from or into the outer package (10).

7. The transport section of claim 3, wherein the angle (β) is between five and fifteen degrees.

8. The transport section of claim 1, wherein the two tensile forces (32) are in a plane parallel to a support surface (22) or are in a plane perpendicular to the support surface (22).

9. A method used to handle outer packages (10) with foldable top flaps (12; 12-v, 12-h, 12-l, 12-r) comprising:
conveying outer packages (10) on at least one conveying device (24) in a conveying direction (18);
unfolding or the holding open of at least two top flaps (12; 12-v, 12-h, 12-l, 12-r) in order to at least partly uncover an opening (16) of the outer package (10) to make accessible an interior space of the outer package (10), and
applying a tensile force (32) to each of the at least two top flaps (12; 12-v, 12-h, 12-l, 12-r) that are perpendicular to the conveying direction (18) and opposite each other.

10. The method of claim 9, further comprising holding each of the at least two top flaps (12; 12-v, 12-h, 12-l, 12-r) approximately parallel to a plane of a conveying device (24).

11. The method of claim 10, further comprising applying the tensile forces (32) with contact elements (34) or rails (36) acting upon a top side and/or upon an underside of the opened top flaps (12; 12-v, 12-h, 12-l, 12-r) while the outer package (10) is being conveyed through between the rails (36) or contact elements (34).

12. The method of claim 11, wherein the contact elements (34) comprise at least one roller (38) contacting the top flap (12; 12-v, 12-h, 12-l, 12-r) and rolling off on said top flap (12; 12-v, 12-h, 12-l, 12-r) during the conveying step, where a rotational plane (40) of the roller (38) and a transport direction (18) enclose an angle (β) between zero degrees and about twenty degrees.

13. The method of claim 12, wherein the tensile forces (32) are produced by the rollers (38) bearing on the top sides of the top flaps (12; 12-v, 12-h, 12-l, 12-r).

14. The method of claim 12, wherein the angle (β) is between five and fifteen degrees.

15. The method of claim 12, further comprising driving the at least one roller (38) with a motor drive.

16. The method of claim 9, further comprising removing articles (14) from the outer package (10) or loading articles (14) into the outer package (10).

17. The method of claim 9, wherein the tensile forces (32) are applied in a plane parallel to a support surface (22).

18. The method of claim 9, wherein the tensile forces (32) are applied in a plane perpendicular to a support surface (22).

* * * * *